United States Patent
Wei

(10) Patent No.: US 8,079,838 B2
(45) Date of Patent: Dec. 20, 2011

(54) PURE PARTICLE GENERATOR

(75) Inventor: Qiang Wei, Belleville, MI (US)

(73) Assignee: Horiba, Ltd. (JP)

( * ) Notice: Subject to any disclaimer, the term of this patent is extended or adjusted under 35 U.S.C. 154(b) by 884 days.

(21) Appl. No.: 11/081,246

(22) Filed: Mar. 16, 2005

(65) Prior Publication Data

US 2006/0208399 A1    Sep. 21, 2006

(51) Int. Cl.
    *B29B 9/00*    (2006.01)
(52) U.S. Cl. ............... 425/6; 425/7; 425/10; 425/80.1; 425/82.1; 264/5; 264/12; 264/437; 239/99; 75/228
(58) Field of Classification Search ............... 425/10, 425/82.1, 6, 174.8 E, 80.1, 7; 73/863.11, 73/863.01, 863.02, 863.03; 264/5, 12, 14, 264/437, 494; 239/99; 424/43, 45, 46, 489; 75/228
See application file for complete search history.

(56) References Cited

U.S. PATENT DOCUMENTS

| | | | |
|---|---|---|---|
| 2,802,236 A * | 8/1957 | Nash | 264/28 |
| 3,342,921 A * | 9/1967 | Brundige et al. | 264/200 |
| 3,642,393 A * | 2/1972 | Ross et al. | 425/6 |
| 3,709,641 A * | 1/1973 | Sarem | 425/7 |
| 4,040,815 A | 8/1977 | Francois et al. | |
| 4,264,641 A | 4/1981 | Mahoney et al. | |
| 4,361,028 A * | 11/1982 | Kamiya et al. | 73/23.33 |
| 4,410,139 A | 10/1983 | Nishikawa et al. | |
| 4,426,337 A * | 1/1984 | Suzuki et al. | 264/4 |
| 4,484,943 A * | 11/1984 | Miura et al. | 75/351 |
| 4,582,731 A * | 4/1986 | Smith | 427/427 |
| 4,586,367 A * | 5/1986 | Lewis | 73/23.33 |
| 4,594,101 A * | 6/1986 | Miura et al. | 75/252 |
| 4,734,451 A * | 3/1988 | Smith | 524/493 |
| 4,746,466 A * | 5/1988 | Takahashi | 261/30 |
| 4,795,330 A | 1/1989 | Noakes et al. | |
| 5,058,440 A * | 10/1991 | Graze, Jr. | 73/863.83 |
| 5,090,258 A * | 2/1992 | Yamasaki et al. | 73/863.03 |
| 5,184,501 A * | 2/1993 | Lewis et al. | 73/23.31 |
| 5,503,372 A * | 4/1996 | Sisson et al. | 266/170 |
| 5,514,349 A * | 5/1996 | Parker et al. | 422/186.21 |
| 5,525,320 A | 6/1996 | Pratsinis et al. | |
| 5,665,277 A * | 9/1997 | Johnson et al. | 264/6 |
| 5,759,228 A * | 6/1998 | Sisson et al. | 75/255 |
| 5,788,738 A * | 8/1998 | Pirzada et al. | 75/331 |
| 5,851,453 A * | 12/1998 | Hanna et al. | 264/5 |
| 5,888,926 A | 3/1999 | Biswas et al. | |

(Continued)

OTHER PUBLICATIONS

Wegner et al., "Design of metal nanoparticle synthesis by vapor flow condensation," Chemical Engineering Science 57 (2002) 1753-1762, Elsevier Science Ltd.—10 pages.

*Primary Examiner* — Joseph Del Sole
*Assistant Examiner* — Seyed Masoud Malekzadeh
(74) *Attorney, Agent, or Firm* — Brooks Kushman P.C.

(57) ABSTRACT

A particle generator is able to generate pure particles for solid or liquid materials with melting points over several hundred degrees Celsius. The material is heated to generate the vapor in a small chamber. Heated nitrogen or some inert gas is used as the carry gas to bring the mixture into a dilution system. As the super saturation ratio of the material is large enough and over a critical value, particles are formed in the dilution system by homogenous nucleation, and grown in the same dilution system as well. The different size distributions and concentrations of the particles can be obtained by varying dilution parameters, such as residence time and dilution ratio.

12 Claims, 2 Drawing Sheets

U.S. PATENT DOCUMENTS

Figure 1:
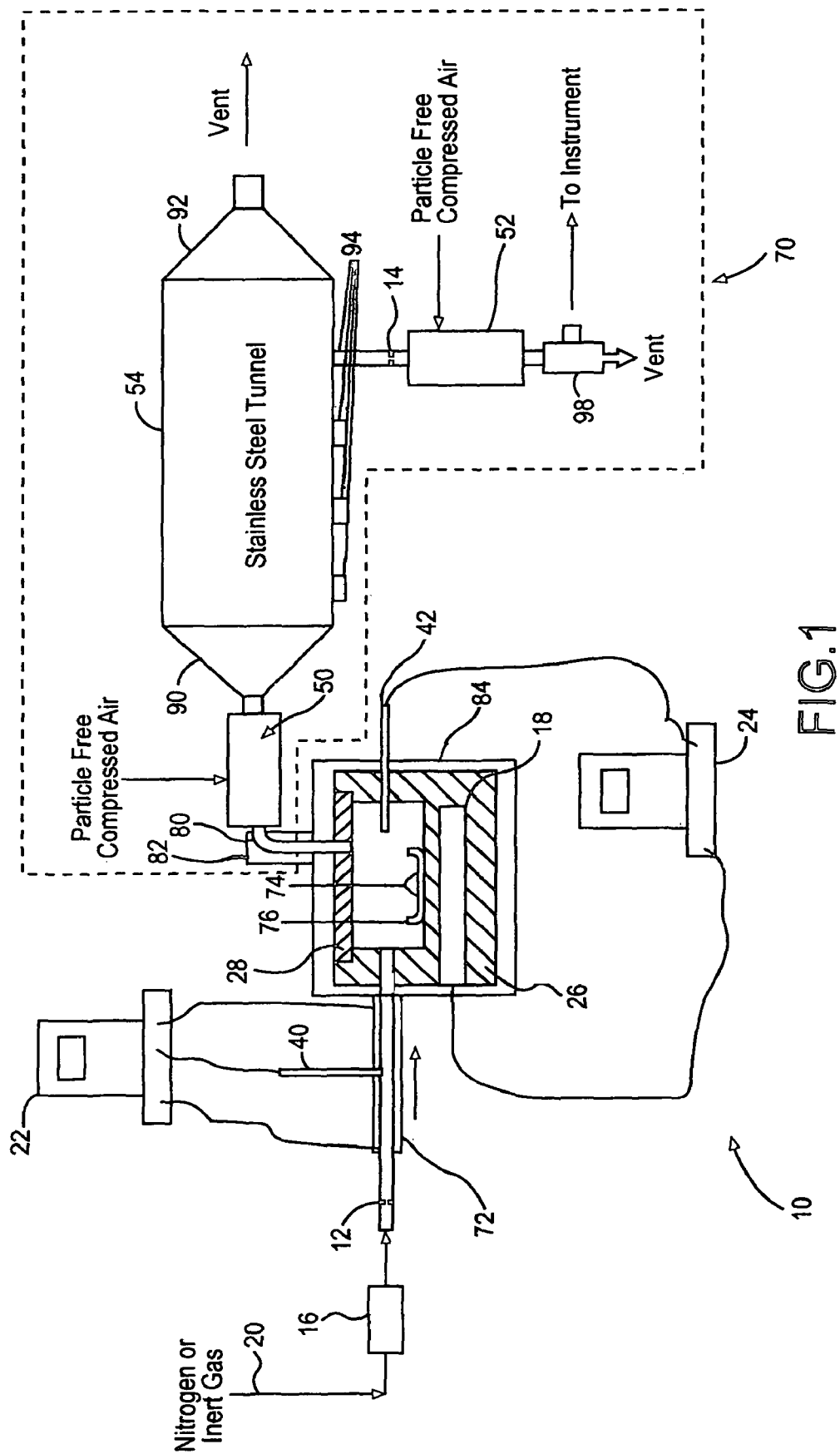

| | | | |
|---|---|---|---|
| 6,062,092 A * | 5/2000 | Weaver | 73/863.03 |
| 6,200,819 B1 * | 3/2001 | Harvey et al. | 436/179 |
| 6,331,290 B1 | 12/2001 | Morgan | |
| 6,379,419 B1 | 4/2002 | Celik et al. | |
| 6,533,563 B1 * | 3/2003 | Otaigbe et al. | 425/6 |
| 6,575,721 B1 * | 6/2003 | Daly et al. | 425/6 |
| 6,615,677 B2 * | 9/2003 | Dickson et al. | 73/863.01 |
| 6,653,591 B1 * | 11/2003 | Peterson et al. | 219/121.47 |
| 6,729,195 B2 * | 5/2004 | Graze, Jr. | 73/863.03 |
| 6,764,720 B2 | 7/2004 | Pui et al. | |
| 6,796,165 B2 * | 9/2004 | Abdul-Khalek | 73/28.01 |
| 7,044,009 B2 * | 5/2006 | Graze, Jr. | 73/863.03 |
| 7,081,267 B2 * | 7/2006 | Yadav | 427/115 |
| 7,083,748 B2 * | 8/2006 | Chattopadhyay et al. | 264/14 |
| 7,160,489 B2 * | 1/2007 | Didenko et al. | 264/14 |
| 7,243,559 B2 * | 7/2007 | Dickson et al. | 73/863.01 |
| 7,261,529 B2 * | 8/2007 | Persyn et al. | 425/8 |
| 7,281,440 B2 * | 10/2007 | Graze et al. | 73/863.02 |
| 7,282,167 B2 * | 10/2007 | Carpenter | 264/80 |
| 7,332,111 B2 * | 2/2008 | Grothe et al. | 264/11 |
| 7,413,690 B1 * | 8/2008 | Cheboyina et al. | 264/13 |
| 2001/0031282 A1 * | 10/2001 | Peter et al. | 424/489 |
| 2003/0180283 A1 * | 9/2003 | Batycky et al. | 424/130.1 |
| 2004/0026804 A1 * | 2/2004 | Gupta et al. | 264/7 |
| 2004/0042971 A1 * | 3/2004 | Truong-Le et al. | 424/46 |
| 2004/0042972 A1 * | 3/2004 | Truong-Le et al. | 424/46 |
| 2004/0178530 A1 * | 9/2004 | Yadav | 264/5 |
| 2004/0218345 A1 | 11/2004 | Yadav et al. | |
| 2005/0051917 A1 * | 3/2005 | Grothe et al. | 264/5 |
| 2005/0082701 A1 * | 4/2005 | Shekunov et al. | 264/5 |
| 2006/0076293 A1 * | 4/2006 | Shekunov et al. | 210/634 |
| 2006/0226564 A1 * | 10/2006 | Carpenter | 264/5 |

* cited by examiner

PURE PARTICLE GENERATOR

BACKGROUND OF THE INVENTION

1. Field of the Invention

The invention relates to particle generators.

2. Background Art

To generate particles, the traditional aerosol atomizer needs first to mix material in some liquid. Then, using compressed air flow through a nozzle, the system generates liquid drops including the selected material. Those drops move with air into some devices, for example, a diffusion dryer. Liquid is removed by the dryer. Finally, particles are left in the air stream.

However, if there is no suitable liquid available, or some residual included in the liquid, or the device is not able to remove the liquid completely, pure particles for the material cannot be generated. Water is the most popular solvent with the current technology for particle generation with the traditional atomizer, but many residual particles are contained in the pure water, even for HPLC grade water, or ultra high purity water. Therefore, there are many limitations on the ability of the traditional atomizer to generate pure particles.

Background information may be found in U.S. Pat. Nos. 4,264,641; 4,410,139; 4,746,466; 4,795,330; 6,331,290; and 6,764,720.

For the foregoing reasons, there is a need for an improved pure particle generator.

SUMMARY OF THE INVENTION

It is an object of the invention to provide an improved pure particle generator.

This particle generator is able to generate pure particles for solid or liquid materials with melting points over several hundred degrees Celsius. The material is heated to generate the vapor in a small chamber. Heated nitrogen or some inert gas is used as the carry gas to bring the mixture into a dilution system. As the super saturation ratio of the material is large enough and over a critical value, particles are formed in the dilution system by homogenous nucleation, and grown in the same dilution system as well. The different size distributions and concentrations of the particles can be obtained by varying dilution parameters, such as residence time and dilution ratio, etc.

In more detail, the pure particle generator generates pure particles for the selected material, and can generate solid and liquid pure particles. When the mixture including the selected material vapor is cooled down and diluted in the dilution system, and if super saturation ratio for the selected material is obtained and over a critical value, pure particles are formed by homogenous nucleation. The homogenous nucleation is defined as the nucleation of vapor on embryos essentially composed of vapor molecules only, in the absence of foreign substances.

Different size distributions and concentrations of the particles are obtained by adjusting the chamber temperature, and the dilution parameters for the dilution system, where dilution parameters are defined as dilution ratio, dilution air temperature, residence time, etc. In a preferred embodiment, a two-stage dilution system is used.

BRIEF DESCRIPTION OF THE DRAWINGS

FIG. 1 is a pure particle generator made in accordance with a preferred embodiment of the invention; and FIG. 2 is a block flow diagram illustrating the working principle of the pure particle generator.

DETAILED DESCRIPTION OF THE PREFERRED EMBODIMENT

With reference to FIG. 1, the pure particle generator is generally indicated at 10. Pure particle generator 10 consists of orifices 12, 14, high efficiency particulate (HEPA) filter 16, heating cartridge 18, carry gas 20, temperature controllers 22, 24, stainless steel block 26 and cover 28, thermocouples 40, 42, ejectors 50, 52, stainless steel tunnel 54, etc.

Nitrogen or some inert gas is used as the carry gas 20. The carry gas 20 should be chosen so as to avoid chemical reaction between the material and the carry gas under the high temperature. The flow rate of the carry gas 20 is restricted by orifice 12, and flow rate of carry gas 20 is controlled by vacuum generated by the first ejector 50 in the two-state dilution tunnel 70. Under a certain carry gas pressure, when vacuum generated by ejector 50 is over a critical value, the critical flow is obtained over orifice 12. As a result, higher vacuum will not change the flow of carry gas.

A high efficiency particulate (HEPA) filter 16 is installed upstream of orifice 12 to remove the particles from the carry gas 20. In this way, there is no contamination on the generated particles.

The carry gas 20 is heated by a heating tube 72 before entering the heated stainless steel block 26. There is a heating tape wrapped on the heating tube 72, and heating tube 72 is insulated by high temperature insulation. The material of heating tube 72 could be either metal or non-metal. The tube material should be selected so as to avoid chemical reaction between the carry gas 20 and the tube material. The temperature of the carry gas 20 is measured by a thermocouple 40, which is installed in the heated tube 72 and able to measure the gas temperature directly. The temperature for carry gas 20 is set according to the physical property of the material, and controlled by temperature controller 22. The purpose for heating the carry gas is to avoid particle formation in the stainless steel chamber when the vapor of the selected material is cooled down. At most of conditions, temperature is set slightly lower than the stainless steel chamber temperature.

The outlet of heating tube 72 is connected to stainless steel block 26 to allow the carry gas 20 to flow into the chamber in the stainless steel block 26. There are one or multiple heating cartridges 18 immersed in the block 26. The thermocouple 42 extrudes into the chamber, and measures the gas temperature in thechamber. The gas temperature in the chamber is controlled by temperature controller 24, which controls on/off for the heating cartridges 18 in the block 26. As a result, the expected gas temperature in the chamber can be obtained.

The selected material 74 in a container 76 sits in stainless steel block 26. Container 76 is made of high temperature material, and does not react to the selected substance (for particles) under high temperatures. The material 74 in the heated block 26 can be installed and removed by opening the stainless steel cover 28. The stainless steel cover 28 is secured on the block 26 by bolts. To avoid leaks at the contact surface between the cover 28 and the block 26, a metal gasket is installed between cover 28 and block 26. An outlet tube 80 is welded on the cover 28. The mixture of the carry gas 20 and the substance vapor can flow out the chamber through outlet tube 80. To minimize the heat transfer from heated block 26 to the ambient surroundings, heated block 26 is insulated with high temperature insulation 84. As well, outlet tube 80 is insulated with insulation 82.

The temperature of the mixture of the carry gas 20 and the vapor is set higher than the melt point of the material 74 and able to provide the high enough super saturation ratio for homogenous nucleation. The saturation ratio is defined as the ratio of the partial pressure of material at temperature T and the saturation vapor pressure of the same material in equilibrium with its liquid phase at the same temperature. When the saturation ratio is larger than 1.0, this is called the super saturation.

The carry gas 20 flows through the chamber of the heated block 26, and brings the mixture into a dilution system. Within the dilution system, the residence time and dilution ratio can be controlled. In the illustrated exemplary implementation, an ejector-type two-stage dilution system is employed.

The inlet of the first ejector 50 of the two-stage dilution tunnel 70 is connected to the outlet of the chamber on the stainless steel cover 28. The length of the connection tubing 80 should be as short as possible. The tubing 80 is wrapped with insulation 82 to minimize the heat transfer with the ambient air.

The two-stage dilution tunnel 70 has first and second ejectors 50, 52. An ejector is operated by the particle free compressed air. When compressed air flows through an annular orifice or a nozzle in the ejector, vacuum is generated at the inlet of the ejector. The vacuum sucks in the mixture of the carry gas 20 and vapor into the ejector. Inside of the ejector, compressed air mixes with the mixture mentioned above. As a result, the mixture (or sample) is cooled down and diluted. Both ejectors 50, 52 work under the same work principles, and such ejectors are commercially available.

The outlet of the first ejector 50 is connected to the cone 90 of a stainless steel tunnel 54. There are two cones on tunnel 54. The first cone 90 on the tunnel 54 and connected to ejector 50 distributes the flow from ejector 50 to reduce the flow velocity difference in the tunnel 54 at the cross-section of the tunnel. The second cone 92 is used to vent the extra flow from the ejector 50. Both cones 90, 92 are welded on the tunnel 54. There are several sampling ports 94 on the tunnel 54. Under the same flow rate from ejector 50, different residence times can be obtained by using different sampling ports 94. By changing the sample position on the stainless steel tunnel 54, the residence time of the dilution tunnel is changed. When the sample port location is far from the sample inlet at the tunnel, the residence time is increased. When one sample port is chosen, the others will be blocked.

The second ejector 52 is connected to one of sample ports 94, which is chosen per the expected residence time at the certain flow rate. The functions of the second ejector 52 are to freeze the change of particle concentration and size distribution in the sample flow by diluting.

One small orifice 14 is in the front of the second ejector 52. Orifice 14 restricts sample flow from the tunnel 54. As a result, the expected dilution ratio on the second stage can be obtained by adjusting compressed air pressure on the second stage ejector 52. The outlet of ejector 52 is connected to a tee 98, having one port connected to the instrument, and the other port being for venting the extra flow from the ejector 52. The flow including pure particles moves into the instrument.

As mentioned above, the dilution ratio on an ejector is controlled by adjusting the compressed air pressure. Normally, when compressed air pressure is higher, more dilution air is provided to the ejector. Due to small orifice 14 upstream from ejector 52 to restrict the flow, the sample flow into ejector 52 is changed slightly or non-changed if the critical flow has been obtained. By this approach, the dilution ratio is increased while higher compressed air pressure is provided. In the opposite, a lower dilution ratio is obtained.

In operation, the pure particles are formed in the first stage of the dilution tunnel 70 by homogenous nucleation while the mixture of the vapor and carry gas from the heated chamber is diluted and cooled down. To have the homogenous nucleation, gas temperature in the chamber of the stainless steel block 26 and the dilution ratio in the first stage can be adjusted to provide high enough super saturation ratio.

It is appreciated that different concentrations and size distributions of the pure particle can be obtained by making appropriate adjustments.

One possible adjustment is to adjust the temperature set point in the chamber. With the higher temperature, more vapor of material 74 will be generated. When the vapor is cooled down in the dilution system, higher super saturation ratio is obtained. As a result, more particles could be formed in the tunnel for the first ejector. In the opposite case, less particles may be formed. When the super saturation ratio cannot be obtained or be over a critical value due to the lower gas temperature of the chamber, no particles may be formed.

Another way to make an adjustment is to adjust the residence time on the two-stage dilution tunnel 70. With the longer residence time in the dilution tunnel, more particles are formed and the size distributions of the particles have potential to move toward larger size ranges. There are mainly two approaches to changing the residence time. The first approach is to change the flow in ejector 50. With higher compressed air pressure in ejector 50, more dilution air flows through the ejector. At the same sample location, the residence time is shorted. In the opposite case, the longer residence time will be obtained. In the second approach to changing the residence time, the sampling location is moved on the tunnel. By moving the sampling port 94 far from ejector 50 without changing the flow rate from ejector 50, the longer residence time can be obtained. In the opposite case, the shorter residence time is obtained.

In another possible adjustment, the dilution ratio may be increased in the second stage. By increasing the dilution ratio in the second stage, the concentration of the particles in the sample flow is reduced. In the opposite case, the concentration is increased.

Figure 2:
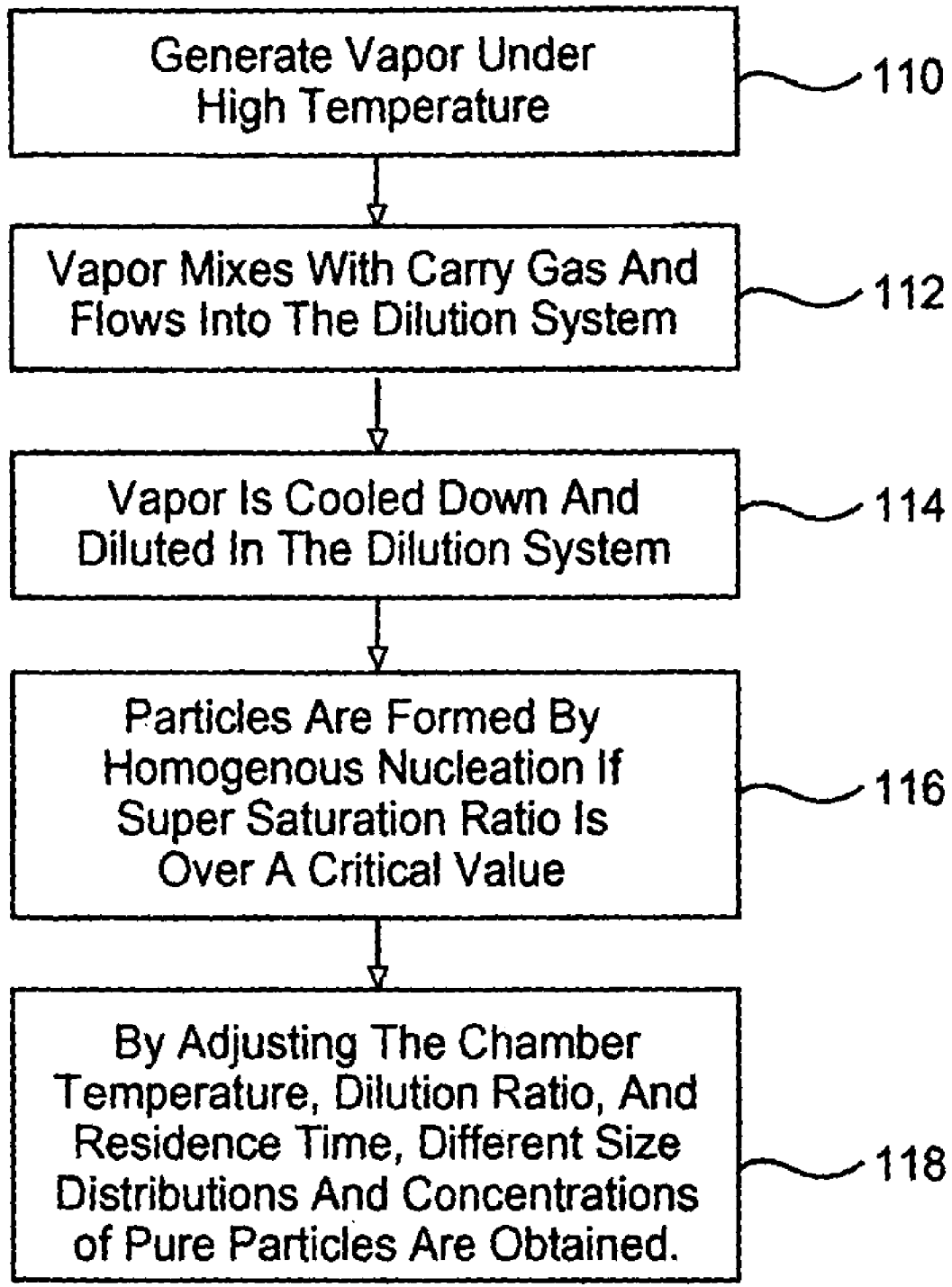

With reference to FIG. 2, a block diagram illustrates the working principle of the pure particle generator. According to the working principle, vapors are generated under high temperature (block 110). Vapor mixes with carry gas and flows into the dilution system (block 112). Vapor is cooled down and diluted in the dilution system (block 114). Particles are formed by homogenous nucleation if super saturation ratio is over a critical value (block 116). By adjusting the chamber temperature, dilution ratio, and residence time, different size distributions and concentrations of pure particles are obtained.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An apparatus for pure particle generation, the apparatus comprising:
    a heater;
    a heating tube heated by the heater, having an inlet for receiving a carry gas, and having an outlet for delivering a heated carry gas;
    a temperature controller for controlling the temperature of the heated carry gas flowing through the tube;
    a heated chamber configured to hold a selected substance for particle generation and configured to generate the substance vapor, the chamber being connected to the tube outlet for receiving the heated carry gas and configured to flow out a mixture of the heated carry gas and the substance vapor;

a temperature controller for controlling the temperature inside the chamber;

a dilution system in the form of a two-stage dilution tunnel including a first dilution stage, a tunnel, and a second dilution stage, the first dilution stage having an inlet connected to the chamber for receiving the mixture, having a dilution gas inlet for receiving a dilution gas, and having an outlet connected to the tunnel, the second dilution stage having an inlet connected to the tunnel, a dilution gas inlet, and an outlet for connecting to an instrument into which formed particles are brought;

wherein the chamber and dilution system are arranged to cause the super saturation ratio of the selected substance to exceed a critical value so as to result in particle formation and growth in the dilution system by homogenous nucleation; and wherein the first dilution stage and the second dilution stage are configured to provide independently controlled dilution ratios, the first dilution stage configured to control particle size distribution, the second dilution stage configured to control particle concentration.

2. The apparatus of claim 1 further comprising:

an orifice that restricts the flow rate of the carry gas through the tube.

3. The apparatus of claim 2 further comprising:

a particulate filter upstream of the orifice to remove particles from the carry gas flowing through the tube.

4. The apparatus of claim 1 wherein the chamber is defined by a steel block and cover.

5. The apparatus of claim 1 further comprising:

the tunnel including a plurality of spaced apart sampling ports, wherein the second dilution stage is connected to a selected port.

6. The apparatus of claim 5 wherein the first and second dilution stages include first and second ejectors for diluting with particle free compressed air.

7. An apparatus for pure particle generation, the apparatus comprising:

a heater;

a heating tube heated by the heater, having an inlet for receiving a carry gas, and having an outlet for delivering a heated carry gas;

a temperature controller for controlling the temperature of the heated carry gas flowing through the tube;

a heated chamber configured to hold a selected substance for particle generation and configured to generate the substance vapor, the chamber being connected to the tube outlet for receiving the heated carry gas and configured to flow out a mixture of the heated carry gas and the substance vapor;

a temperature controller for controlling the temperature inside the chamber;

a dilution system in the form of a two-stage dilution tunnel including a first dilution stage, a tunnel, and a second dilution stage, the first dilution stage having an inlet connected to the chamber for receiving the mixture, having a dilution gas inlet for receiving a dilution gas, and having an outlet connected to the tunnel, the second dilution stage having an inlet connected to the tunnel, a dilution gas inlet, and an outlet for connecting to an instrument into which formed particles are brought;

wherein the chamber and dilution system are arranged to cause the super saturation ratio of the selected substance to exceed a critical value so as to result in particle formation and growth in the dilution system by homogenous nucleation; and wherein the first dilution stage and the second dilution stage are configured to provide independently controlled dilution ratios.

8. The apparatus of claim 7 further comprising:

an orifice that restricts the flow rate of the carry gas through the tube.

9. The apparatus of claim 8 further comprising:

a particulate filter upstream of the orifice to remove particles from the carry gas flowing through the tube.

10. The apparatus of claim 7 wherein the chamber is defined by a steel block and cover.

11. The apparatus of claim 7 further comprising:

the tunnel including a plurality of spaced apart sampling ports, wherein the second dilution stage is connected to a selected port.

12. The apparatus of claim 11 wherein the first and second dilution stages include first and second ejectors for diluting with particle free compressed air.

* * * * *